(No Model.)
J. B. C. KRÖHNKE.
FILTERING APPARATUS.
No. 548,209.  Patented Oct. 22, 1895.
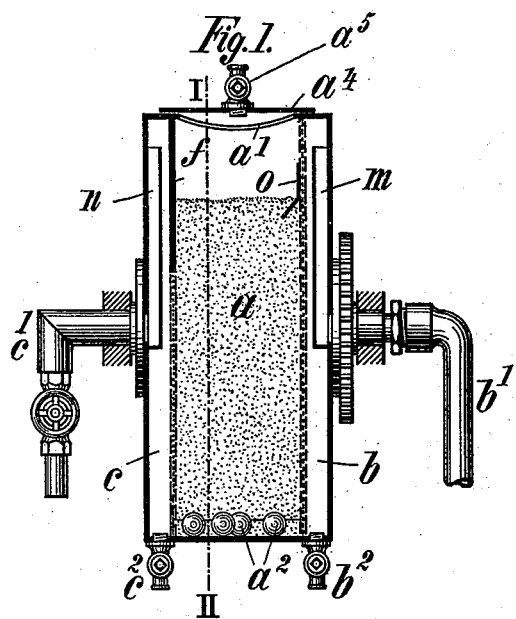
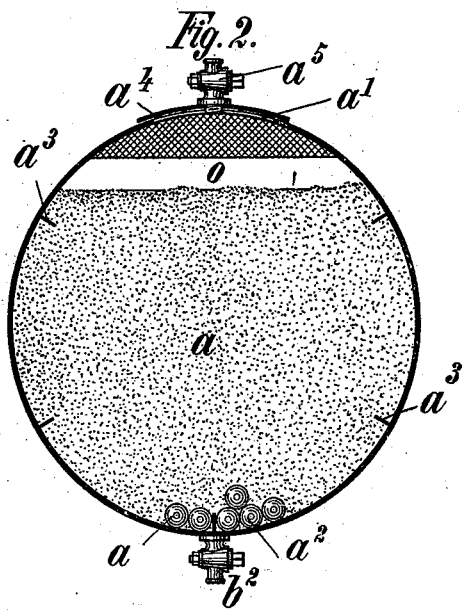
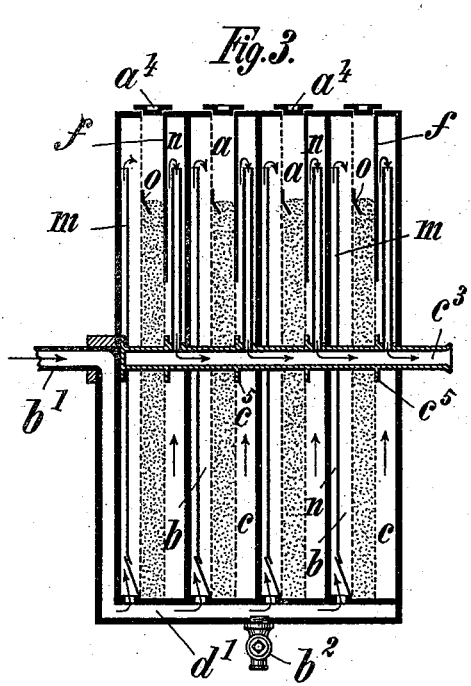
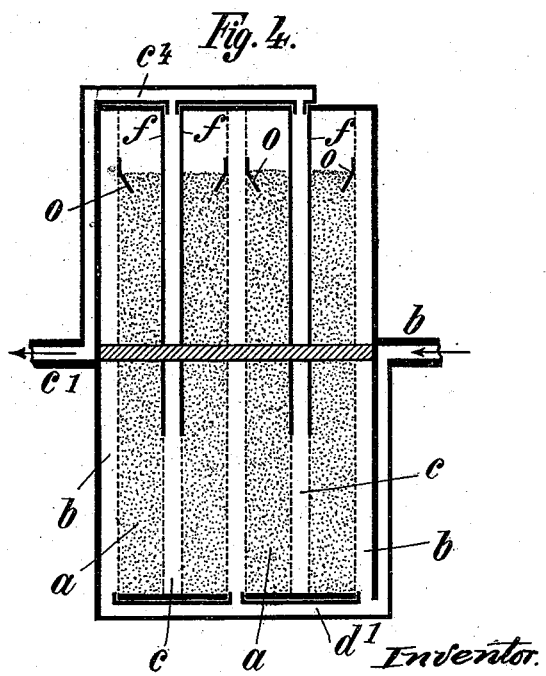
Witnesses:
Inventor:
Johannes Berthold Christian Kröhnke
By

UNITED STATES PATENT OFFICE.

JOHANNES BERTHOLD CHRISTIAN KRÖHNKE, OF HAMBURG, GERMANY.

FILTERING APPARATUS.

SPECIFICATION forming part of Letters Patent No. 548,209, dated October 22, 1895.

Application filed May 4, 1895. Serial No. 548,128. (No model.)

*To all whom it may concern:*

Be it known that I, JOHANNES BERTHOLD CHRISTIAN KRÖHNKE, a subject of the German Emperor, and a resident of Hamburg, in the German Empire, have invented certain new and useful Improvements in Filtering Apparatus, of which the following is a specification.

My invention relates to apparatus for filtering liquids; and the object of the same is to afford facilities for the proper cleaning and regaining the original of the filtering material without requiring the removal of the same when a certain time in use.

An apparatus constructed according to my said invention consists, substantially, of a drum or casing adapted to turn upon two horizontal hollow axes and closed at its two ends. In its simplest constructional form this drum or casing has its interior divided by two transverse partitions into three chambers—that is to say, a large chamber in the middle and two narrower lateral chambers. The middle chamber constitutes the filtering-chamber proper, while the two lateral chambers serve, respectively, for the introduction of the unfiltered water or liquid admitted through the hollow axis of the drum and for the reception of the filtered water or liquid which has passed through the middle chamber and which flows thence through the second hollow axis, as will now be fully described, reference being had to the accompanying drawings, in which—

Figure 1 is a sectional side elevation of my improved filtering apparatus in its simplest constructional form. Fig. 2 is a vertical section of the apparatus on the line I I, Fig. 1. Fig. 3 is a sectional side elevation of a multiple filtering apparatus made according to my said invention, and Fig. 4 illustrates a modification of the same.

Similar letters of reference are employed to indicate like parts wherever such may occur in the figures of the drawings above described.

$a$ is the filtering-chamber, $b$ the inlet-chamber, and $c$ the outlet-chamber of the liquid to be filtered. The liquid is admitted through the hollow axis $b'$, passes the chambers $b$, $a$, and $c$, and flows thence through the hollow axis $c'$.

For operating the filtering apparatus I fill the middle chamber $a$ for the most part, but not completely, with sand or other filtering material. The partitions between the chambers consist of wire-gauzes, which are fine enough for retaining the filtering material and are preferably strengthened exteriorly by a coarse grating against the pressure of the water and sand or other filtering material. The partition between the middle chamber and the outlet-chamber is pervious only below to about one-third to two-thirds of its height, (stretched over with wire-gauze,) its other upper part being impervious in order to prevent unfiltered water or liquid passing over an upper empty space directly into the outlet-chamber. The outlet-opening in the corresponding hollow axis $c'$, prolonged to the outside, is adapted to be partially or wholly closed for regulating the speed of filtration. At their lower peripheral surface the two lateral chambers $b$ and $c$, moreover, may be provided with adjustable outlet-openings or stopcocks $b^2$ and $c^2$ for cleaning purposes. The sand or other filtering material is filled into the middle chamber $a$ through an opening $a'$ in the upper peripheral surface of the drum, adapted to be closed by a cover $a^4$, and the air in the upper space of this chamber can escape at the commencement of the filtration through a suitable stop-cock $a^5$, which may be arranged on the cover $a^4$ or elsewhere.

The object of the aforesaid upper free space in the middle chamber is particularly designed to admit an effectual cleaning of the filter, as will be understood from the following:

When, for instance, after prolonged use the filter has become clogged, the drum is caused by suitable gear $b^3$, in connection with any suitable driving mechanism, to turn upon its axis. As either prior to the turning movement the drum has been filled with water and the outlet-opening closed, or a slight flow of water is maintained through the drum during the turning movement, the grains of sand or other filtering material are kept in continual motion relatively to each other by the water during the rotation of the drum. Room being left them for this purpose by reason of the said upper free space in the middle filter-chamber $a$, accordingly they rub against each other, thereby not only rinsing, but also triturating and dividing the deposited and adhering slime and dirt, which the water carries away through the outlet in the hollow axis $c'$. The current of the water during this cleaning process may continue in the same direction as during the filtration; but it is obvious that the contrary direction is more convenient, and, moreover, the thorough cleaning of the filtering material and rinsing the slime are obtained in less than half the time, and consequently the waste of water correspondingly reduced. In a few minutes the sand or other granular filtering material becomes in this manner quite clean again and regains its original filtering capacity without requiring to be renewed. The rubbing of the filtering material may be augmented by inclined rods, (not represented,) which may serve at the same time for stiffening the walls of the filter, but still more by iron balls $a^2$ or rounded stones within the filtering material, which, being raised to a certain height by projections $a^3$, provided on the interior periphery of the drum, fall down through the filtering material. In order that the wire-gauze shall not become worn in consequence of the friction caused by the filtering material, it may also be protected by coarse wirework on the side of the filtering material. Of course the several parts of the drum are connected with each other as far as needful, so as to enable them to be easily removed. After the cleaning has taken place the first water having passed the filtering material is allowed to flow off through the lower cock $c^2$ of the lateral outlet-chamber $c$ or else through the hollow axis $c'$ of the latter until the filter is again in working order, which requires from about five to ten minutes.

If it is desired to sterilize the filter, boiling water or steam may be passed through the same while the drum rotates, or the closed drum, filled almost wholly with water, is caused to rotate after a little caustic soda or lime-milk has been added, washing out with water after the completed sterilization by again opening the inlet and outlet. As dry filtering-sand absorbs about twenty per cent. of water and becomes sufficiently liquid with twenty-five per cent. the consumption of disinfecting agents, which may partly be used again, is very small. For instance, caustic soda, forming one four-thousandth part of the weight of sand, constitutes, with the water in the sand and the water which fills the narrow lateral chambers, a liquor containing about one-tenth per cent. of caustic soda, which is more than strong enough not only for killing in an hour all micro organisms, but for almost entirely dissolving the same.

In view of the facility with which the filter can be cleaned and sterilized it is expedient to use sand which is as fine-grained as possible and is freed by water only from clayey slime. A filter with sand the grains of which are of such a size that it does not pass through the meshes of the wire-gauze will get into working order much more rapidly than a filter charged with coarse sand and filters with the same rapidity as the latter if this is sufficiently stopped up to give a faultless filtrate. When the finest sand is used, a layer having a thickness of ten centimeters is ample. For coarser sand the layer will require to be proportionately thicker.

As the parts of dirt are chiefly deposited only on the surface of a layer of sand over which the impure water is led into the layer and form there a filtering-layer, the before-described filter has two filtering-surfaces—that is to say, a surface at a right angle to the rotary axis along the partition between the middle or filtering chamber $a$ and the lateral inlet-chamber $b$ and a horizontal filtering-surface upon the layer of sand in the middle chamber $a$. Accordingly the filtering-drum may have small dimensions and yet possess a great capacity.

In order that the liquid to be filtered may be passed through the drum in such a manner that the filtering-surfaces will be utilized to the greatest extent, and the liquid does not leave the filtering chamber insufficiently purified, I may arrange both in the inlet-chamber $b$ and in the outlet-chamber $c$ a channel $m$ and $n$, which may extend in the direction of a radius from the inlet or outlet opening of the rotary axis close to the peripheral surface of the drum. Moreover, I may arrange in the filtering-chamber $a$, at the height of the layer of sand and against the partition between the filtering and the inlet chamber $a$ and $b$, an angular plate $o$, projecting into the sand and designed to prevent any disturbance of the upper exposed edge of the surface of the filtering material. The liquid rises in the said radial channel $m$ of the inlet-chamber and a portion is then distributed in the lateral chamber $b$ and passes through the vertical perforated partition toward the before-mentioned filtering-surface, while the other portion passes through the perforated partition above on to the horizontal filtering-surface of the sand. By reason of the upper unperforated part $f$ of the partition between the outlet-chamber and the filtering-chamber and the said radial outlet-channel $n$ the liquid passes everywhere through the sand. The said angular plate $o$ prevents the passage of the liquid in one corner of the surface of the sand, whereby the deposited layer of slime would be stirred up and disturbed in its filtering action.

The three chambers $a\ b\ c$ (the inlet, filtering, and outlet chambers) of the before-described apparatus for filtering liquids may also be arranged a number of times side by side in a single casing, so that the liquid to be purified will be distributed to all the groups of chambers and filtered in larger quantities. Such a combination of several groups of chambers, Fig. 3, may have a common inlet-channel $b'\ d'$, from which the liquid passes through upward-extending channels $m$ into the several inlet-chambers $b$. The purified liquid is then collected from all the outlet-chambers $c$ in a common outlet-tube $c^3$ through the radial pipes $n$, and may thence be conducted to the place where it is used. The collecting-tube $c'$, passing through the several groups of chambers, may be provided with flanges $c^5$, which bear against the partitions between the filtering and outlet chambers $a$ and $c$ and prevent the passage of still impure liquid along the outside of the collecting-tube $c^3$ from the inlet-chambers $b$ into the outlet-chambers $c$, respectively, in consequence of settling of the filtering material.

In some cases, and particularly in application with a multiple filtering apparatus, I dispense with the aforesaid radial channels $m$ and $n$, both in the inlet-chambers $b$ and in the outlet-chambers $c$ within the common casing or drum, Fig. 4, in such a manner that for each pair of filtering-chambers $a$ only one outlet-chamber $c$ is required and the filtered liquid is conducted through a common channel $c^4$ at the upper surface of the drum to the hollow outlet axis $c'$. Thus the collecting-tube $c^3$, Fig. 3, of the purified liquid need not to pass through the several groups of chambers, and the possibility of still impure liquid escaping into the outlet-chambers $c$ of the filtering apparatus is entirely obviated. The filtering-chambers, which can be made accessible through detachable covers $a^4$, may also be supplied with a number of balls or the like for supporting the whirling and rubbing of the filtering material for the purpose of cleaning the latter on rotating the drum, as hereinbefore set forth, with regard to the filtering apparatus. (Shown by Figs. 1 and 2.) Furthermore, mud and air cocks are to be provided at suitable places of the drum wherever they may be deemed expedient or required for satisfactory working of the filtering apparatus.

Having fully described my invention, what I claim, and desire to secure by Letters Patent, is—

1. A filter comprising a casing divided into inlet and outlet chambers and an intermediate filtering chamber by a foraminous and a partly foraminous and partly solid partition respectively, tubular journals for said casing, one of said journals having its outlet proximate to the inner periphery of the casing above the filter bed within the inlet chamber, and the other journal having its inlet within the outlet chamber, likewise above the filter bed proximate to the inner periphery of the casing and the non-foraminous portion of the partition between said outlet and filter chambers, for the purpose set forth.

2. A filter comprising a casing divided into inlet and outlet chambers and an intermediate filtering chamber by a foraminous and a partly foraminous and partly solid partition respectively, tubular journals for said casing, one of said journals having its outlet proximate to the inner periphery of the casing above the filter bed within the inlet chamber, and the other journal having its inlet within the outlet chamber likewise above the filter bed proximate to the inner periphery of the casing and the non-foraminous portion of the partition between said outlet and filter chambers, in combination with the plate $o$ extending obliquely from one of the partitions into the filter chamber, for the purpose set forth.

3. A filter comprising a revoluble casing divided into inlet and outlet chambers and an intermediate filtering chamber provided with tubular journals, said journals communicating with said inlet and outlet chambers respectively, said filter chamber partly filled with a granular material, in combination with solid bodies $a^2$ loosely contained in the filtering chamber, for the purpose set forth.

4. A filter comprising a revoluble casing divided into inlet and outlet chambers and an intermediate filtering chamber and provided with tubular journals, said journals communicating with said inlet and outlet chambers respectively, said filter chamber partly filled with a granular filtering material, and valved purge pipes for the inlet and outlet chambers, in combination with solid bodies $a^2$ loosely contained in the filtering chambers, for the purpose set forth.

5. A filter comprising a revoluble cylindrical casing divided into inlet and outlet chambers and an intermediate filtering chamber partly filled with a granular filtering material, radial ledges $a^3$ projecting from the periphery of the casing into the filter chamber, and tubular journals for said casing communicating respectively with the inlet and outlet chambers, in combination with solid bodies $a^2$ contained in the filtering chamber, for the purpose set forth.

6. A filter comprising a casing divided into a plurality of chambers by solid partitions each of said chambers divided by a foraminous partition and a partly foraminous and partly non-foraminous partition into inlet and outlet chambers and an intermediate filtering chamber, respectively, tubular journals for said casing, one of said journals in communication with all the inlet chambers above the filter bed in the filter chambers, and the other journal in communication with all the outlet chambers likewise above the filter bed, in the filter chambers between a solid partition and the impermeable portion of a contiguous partition, for the purpose set forth.

7. A filter comprising a revoluble cylindrical casing divided interiorly by non-foraminous partitions into a plurality of cylindrical spaces, said spaces divided by a foraminous and a partly foraminous and partly solid partition into three chambers $a\ b\ c$, tubular journals for said casing, one of said journals communicating with all the chambers $c$ through ducts having their inlet proximate to the inner periphery of such chambers between a non-foraminous partition and the non-foraminous portion of one of the foraminous partitions, the other journal communicating with all the chambers $b$ through ducts having their outlet likewise proximate to the inner periphery of such chambers between a non-foraminous and a foraminous partition and a filtering material contained in the chambers $a$, substantially as and for the purpose set forth.

In testimony that I claim the foregoing as my invention I have signed my name, in presence of two witnesses, this 20th day of April, 1895.

JOHANNES BERTHOLD CHRISTIAN KRÖHNKE.

Witnesses:
ALEXANDER SPECHT,
DIEDRICH PETERSEN.